US008817791B2

(12) United States Patent
Lee et al.

(10) Patent No.: US 8,817,791 B2
(45) Date of Patent: Aug. 26, 2014

(54) APPARATUS AND METHOD FOR VIRTUALIZING MULTIPLE TERMINALS

(75) Inventors: Kyoung-Hee Lee, Daejeon-si (KR); Sung-Kuen Lee, Anyang-si (KR); Seng-Kyoun Jo, Cheongju-si (KR); Il-Gu Jung, Daejeon-si (KR); Hyun-Woo Lee, Daejeon-si (KR); Won Ryu, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 148 days.

(21) Appl. No.: 13/312,351

(22) Filed: Dec. 6, 2011

(65) Prior Publication Data

US 2012/0147889 A1 Jun. 14, 2012

(30) Foreign Application Priority Data

Dec. 10, 2010 (KR) ........................ 10-2010-0126477

(51) Int. Cl.
*G06F 15/16* (2006.01)

(52) U.S. Cl.
USPC ........................................................ 370/392

(58) Field of Classification Search
CPC ..................... H04L 29/0635; H04L 29/06095; H04L 49/3009; H04L 12/56; H04L 2012/56
USPC ......................................... 370/392, 389, 351
See application file for complete search history.

(56) References Cited

U.S. PATENT DOCUMENTS

| 7,190,969 | B1 * | 3/2007 | Oh et al. ..................... 455/551 |
| 2005/0025135 | A1 * | 2/2005 | Chitrapu ..................... 370/352 |
| 2006/0146781 | A1 * | 7/2006 | Adrangi et al. ............. 370/349 |
| 2006/0259583 | A1 * | 11/2006 | Matsuura ..................... 709/218 |
| 2007/0019645 | A1 * | 1/2007 | Menon ......................... 370/390 |
| 2011/0274041 | A1 * | 11/2011 | Perras et al. ................ 370/328 |
| 2012/0269182 | A1 * | 10/2012 | Walker ......................... 370/338 |

FOREIGN PATENT DOCUMENTS

| KR | 10-2008-0086209 | 9/2008 |
| KR | 10-0931688 | 12/2009 |

* cited by examiner

*Primary Examiner* — Andrew Lai
*Assistant Examiner* — Zhiren Qin
(74) *Attorney, Agent, or Firm* — Staas & Halsey LLP (57) ABSTRACT

An apparatus and method for virtualizing multiple terminals are provided. The apparatus includes a terminal virtualizer configured to virtualize a group of a plurality of transmitter terminals of a first user and a group of receiver terminals of a second user through the change of source and destination addresses of a packet that is transmitted between the transmitter terminal group and the receiver terminal group so that the transmitter terminal group and the receiver terminal group may be recognized as if they were single terminals. Accordingly, it is possible to provide seamless IP connectivity regardless of which terminal is currently being used by a user.

9 Claims, 7 Drawing Sheets

APPARATUS AND METHOD FOR VIRTUALIZING MULTIPLE TERMINALS

CROSS-REFERENCE TO RELATED APPLICATION(S)

This application claims the benefit under 35 U.S.C. §119(a) of Korean Patent Application No. 10-2010-0126477, filed on Dec. 10, 2010, in the Korean Intellectual Property Office, the entire disclosure of which is incorporated herein by reference for all purposes.

BACKGROUND

1. Field

The following description relates to techniques for managing IP addresses and transmitting data, and more particularly, to a technique to facilitate the transmission of data through virtualization of multiple terminals.

2. Description of the Related Art

Virtualization has been widely used in various fields of application such as, for example, in server group virtualization for stably providing services to multiple users, in distributed cooperative systems, i.e., virtual machine or cloud computing system, for virtualizing distributed resources and services as if they originated from a single system, and in server-based computing (SBC) to improve the efficiency and environment of use of resources.

With the development of multi-screen services such as, for example, triple play service (TPS)/quadruple play service (QPS), the demand for techniques to control the management of IP addresses and the transmission of data for users who wish to use a variety of terminals in various places at various times has increased. To meet this demand, a method is needed to virtualize multiple terminals into a group as if they were a single terminal

SUMMARY

The following description relates to techniques for virtualizing multiple terminals and for controlling the transmission of data over a network through virtualization of multiple terminals.

In one general aspect, there is provided an apparatus for virtualizing multiple terminals, including: a terminal virtualizer configured to virtualize a group of a plurality of transmitter terminals of a first user and a group of receiver terminals of a second user through the change of source and destination addresses of a packet that is transmitted between the transmitter terminal group and the receiver terminal group so that the transmitter terminal group and the receiver terminal group may be recognized as if they were single terminals.

The terminal virtualizer may include a mapping information management unit configured to manage mapping information between user identification (ID) information regarding the first and second users and IP addresses of the plurality of transmitter terminals and the plurality of receiver terminals and a packet transmission control unit configured to control the transmission of the packet by changing source and destination addresses of the packet based on the mapping information.

In another general aspect, there is provided a method of virtualizing multiple terminals, including: registering first mapping information between user ID information regarding a first user and IP addresses of a group of a plurality of transmitter terminals of the first user; registering second mapping information between user ID information regarding a second user and IP addresses of a group of a plurality of receiver terminals of the second user; and controlling the transmission of a packet between the transmitter terminal group and the receiver terminal group by changing source and destination addresses of the packet based on the first mapping information and the second mapping information so that the transmitter terminal group and the receiver terminal group may be recognized as if they were single terminals.

In another general aspect, there is provided a method of virtualizing multiple terminals, including: registering first mapping information between user ID information regarding a first user and IP addresses of a group of a plurality of transmitter terminals of the first user; registering second mapping information between user ID information regarding a second user and IP addresses of a group of a plurality of receiver terminals of the second user; and controlling the transmission of a packet between the transmitter terminal group and the receiver terminal group by changing source and destination addresses of the packet based on the first mapping information and the second mapping information so that the transmitter terminal group and the receiver terminal group may be recognized as if they were single terminals.

In another general aspect, there is provided a method of virtualizing multiple terminals, including: registering binding information between a HoA and a plurality of CoAs of a group of a plurality of mobile terminals of a user; in response to a packet having user ID information regarding the user as a source address being received from a correspondent node (CN), changing the source address of the received packet from the user ID information regarding the user to an IP address of an active mobile terminal, which is one of the plurality of mobile terminals currently being used by the user, based on the binding information and encapsulating the received packet; and transmitting the encapsulated packet to the active mobile terminal by performing IP tunneling.

Other features and aspects may be apparent from the following detailed description, the drawings, and the claims.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1:
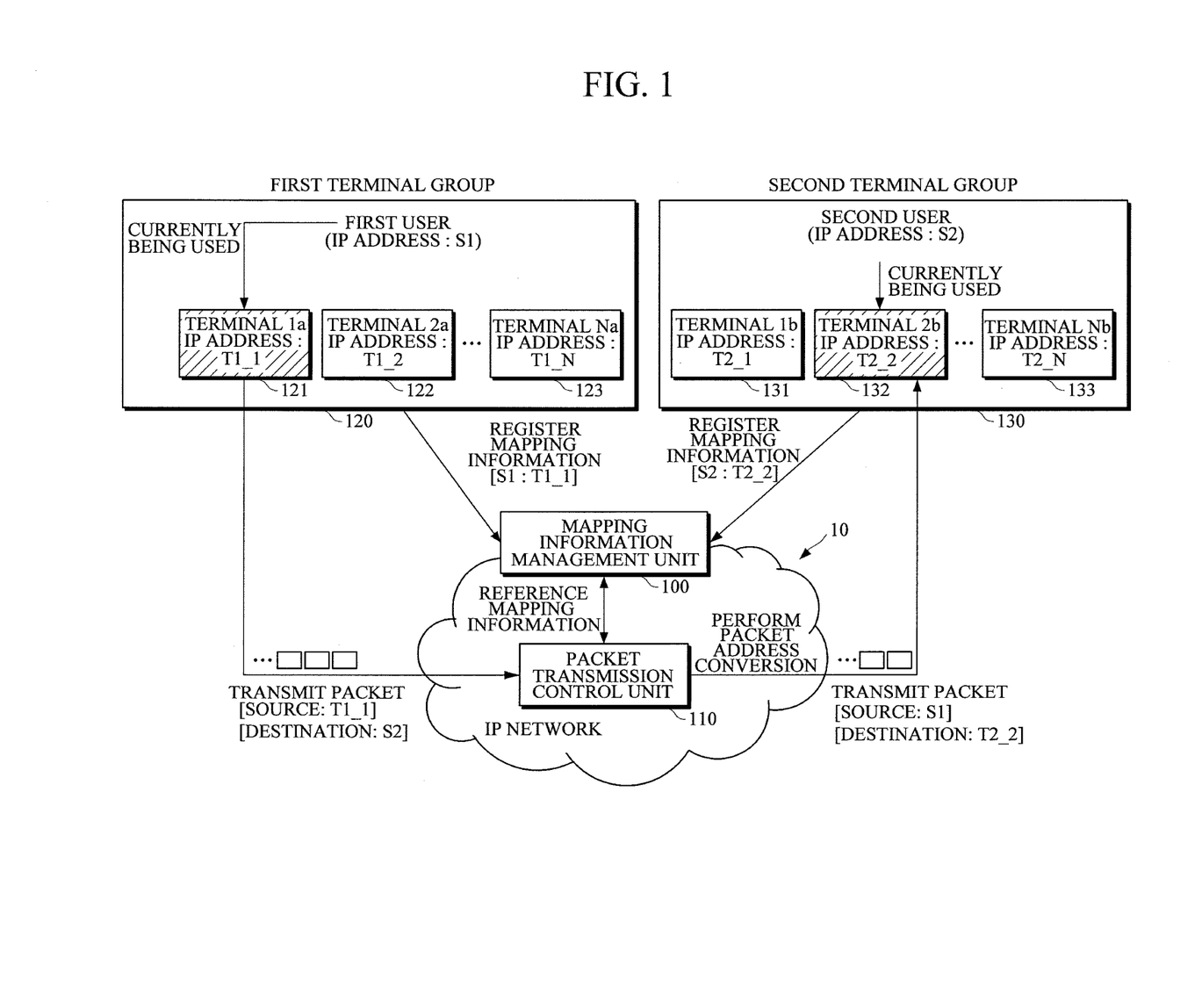
FIG. 1 is a diagram illustrating an example of an apparatus for virtualizing multiple terminals and an example of the transmission of data by the apparatus.

FIG. 1 illustrates an example of an apparatus for virtualizing multiple terminals and an example of the transmission of data by the apparatus.

Various aspects are directed to providing seamless IP network connectivity regardless of which terminal is currently being used by a user. In a non-limiting example, referring to FIG. 1, apparatus 10 may be realized in a multi-screen-based service environment. The apparatus 10 may manage mapping information between user identification (ID) information on one or more users to the IP addresses of the users' terminals in a network, and may virtualize one or more terminal groups including the users' terminals through change of the source and destination addresses of packets.

Referring to FIG. 1, the apparatus 10 includes a mapping information management unit 100 and a packet transmission control unit 110. The mapping information management unit 100 may manage mapping information between user ID information on first and second users and the IP addresses of a plurality of terminals 1a (121), 2a (122), ..., Na (123) and 1b (131), 2b (132), ..., Nb (133). The packet transmission control unit 110 may control the transmission of packets between the terminals by changing the source and destination addresses of the packets based on the mapping information.

For example, referring to FIG. 1, the terminals 1a (121), 2a (122), ..., Na (123) and 1b (131), 2b (132), ..., Nb (133) may include nearly all types of electronic devices having a basic IP protocol function. The mapping information management unit 100 and the packet transmission control unit 110 may not necessarily be hardware elements, and are not limited to certain hardware functions, certain positions in a network, or certain methods of realization of physical devices.

FIG. 1 illustrates an example of an IP network in which the first and second users transmit packets to each other using first and second terminal groups 120 and 130, respectively. For example, assume that the first user possesses N terminals, i.e., the terminals 1a (121), 2a (122), ..., Na (123), and that the second user also possesses N terminals, i.e., the terminals 1b (131), 2b (132), ..., Nb (133). In this example, the terminals 1a (121), 2a (122), ..., Na (123) may be virtualized into the first terminal group 120, and the terminals 1b (131), 2b (132), ..., Nb (133) may be virtualized into the second terminal group 130.

Each of the first and second users may be provided, either in advance or upon accessing a network for the first time, with an IP address that is to be used as a user ID. For example, an IP address S1 may be allocated to the first user, and an IP address S2 may be allocated to the second user. The terminals 1a (121), 2a (122), ..., Na (123) and 1b (131), 2b (132), ..., Nb (133) may be provided with IP addresses T1_1, T1_2, ..., T1_N and T2_1, T2_2, ..., T2_N, respectively, for using an IP communication function.

A method and a procedure in which the terminals 1a (121), 2a (122), ..., Na (123) and 1b (131), 2b (132), ..., Nb (133) acquire their IP addresses are not within the scope of the invention. In a non-limiting example, the terminals 1a (121), 2a (122), ..., Na (123) and 1b (131), 2b (132), ..., Nb (133) may acquire their IP addresses using a static address allocation method or a dynamic host configuration protocol (DHCP).

In the example illustrated in FIG. 1, an IP address may be used as a user ID. In another example, any information that identifies a user such as, for example, an email address, a public switched telephone network (PSTN) number or a mobile telephone network (MTN) number, a uniform resource locator (URL) or uniform resource identifier (URI), an international mobile subscriber identifier (IMSI), a network access identifier (NAI) or the like may be used as a user ID.

Referring to FIG. 1, mapping information between the IP address of a user and the IP address of an active terminal, which is a terminal currently being used by the user, may be registered by being transmitted to the mapping information management unit 100.

In response to the terminal 1a (121) being an active terminal of the first user, mapping information between the IP address of the first user and the IP address of the terminal 1a (121), i.e., [S1:T1_1], may be registered by being transmitted to the mapping information management unit 100. Similarly, in response to the terminal 2a (132) being an active terminal of the second user, mapping information between the IP address of the second user and the IP address of the terminal 2a (132), i.e., [S2:T2_2], may be registered by being transmitted to the mapping information management unit 100.

To register mapping information, each terminal may need to have user ID information such as, for example, the IP address of a user, and may also need to be able to transmit mapping information to the mapping information management unit 100. A method and a procedure in which to detect a terminal currently being used by a user are not within the scope of the invention. A terminal currently being used by a user may be detected using various methods such as, for example, using a sensor, using a user login method, or using an input from a user.

In a case in which a user changes an existing active terminal for a new active terminal, updated mapping information, i.e., mapping information between the IP address of the user and the IP address of the selected terminal, may be transmitted to the mapping information management unit 100. For example, in a case in which the first user stops using the terminal 1a (121) and begins to use the terminal 2a (122) as a new active terminal, the terminal 2a (122) may transmit updated mapping information, i.e., [S1: T1_2], to the mapping information management unit 100.

In response to the registration of mapping information being complete, the first and second terminal groups 120 and 130 may transmit a packet to or receive a packet from each other through terminal virtualization. For example, referring to FIG. 1, the first terminal group 120 may transmit a packet to the second terminal group 130. In this example, the packet may be transmitted from the first terminal group 120 to the second terminal group 130 via a network by using a typical IP protocol, and the IP address of the terminal 1a (121), i.e., T1_1, and the IP address of the second user, i.e., S2, may be set as the source and destination addresses, respectively, of the packet. Since the active terminal of the first user, i.e., the terminal 1a (121), may set its IP address as a source address and set the IP address of the second user, i.e., S2, as a destination address when transmitting a packet to the second user, the terminal 1a (121) does not need an IP address conversion function, which may facilitate application to an existing IP protocol stack. Even when the second user keeps changing his or her active terminal, data sockets may be regenerated (or reset), or packets may be seamlessly transmitted without a requirement of session reestablishment.

During the transmission of a packet from the first terminal group 120 to the second terminal group 130 via an IP network, the packet transmission control unit 110 may change the source and destination addresses of the packet. In the example illustrated in FIG. 1, the source address of the packet may be changed from T1_1 to S1, and the destination address of the packet may be changed from S2 to T2_2. For example, the address-changed packet may be transmitted to the terminal 2*b* (132), which is the active terminal of the second user, using a typical IP packet routing function. In this example, the active terminal of the second user may receive only packets from the IP address of the first user, i.e., S1, and thus does not need to determine which of the terminals 1*a* (121), 2*a* (122), . . . , Na (123) is the active terminal of the first user. In addition, even when the first user keeps changing his or her active terminal, data sockets may be regenerated (or reset), or packets may be seamlessly transmitted without a requirement of session reestablishment.

The packet transmission control unit 110 may change the source and destination addresses of a packet with reference to IP address mapping information that is registered in the mapping information management unit 100. The packet transmission control unit 110 may change the source and destination addresses of a packet using various methods. For example, the packet transmission control unit 110 may change the source and destination addresses of a packet by directly modifying the header of the packet or by performing tunneling through packet encapsulation.

The packet transmission control unit 110 may be configured to be placed at various locations in a network, and to have various structures. For example, in a case in which the apparatus 10 is realized based on an IP mobility control protocol such as MIP, Proxy MIP (PMIP), or the like, the packet transmission control unit 110 may perform address conversion in a function entity that corresponds to a home agent (HA) or a local mobility agent (LMA) through packet encapsulation. In this example, a function entity corresponding to a foreign agent or a mobility access gateway or a mobile terminal may serve as an end of an IP tunnel that is generated by the HA or the LMA. An example of an MIP-based apparatus for virtualizing multiple terminals is described with reference to FIGS. 4, 5A and 5B.

Figure 2A:
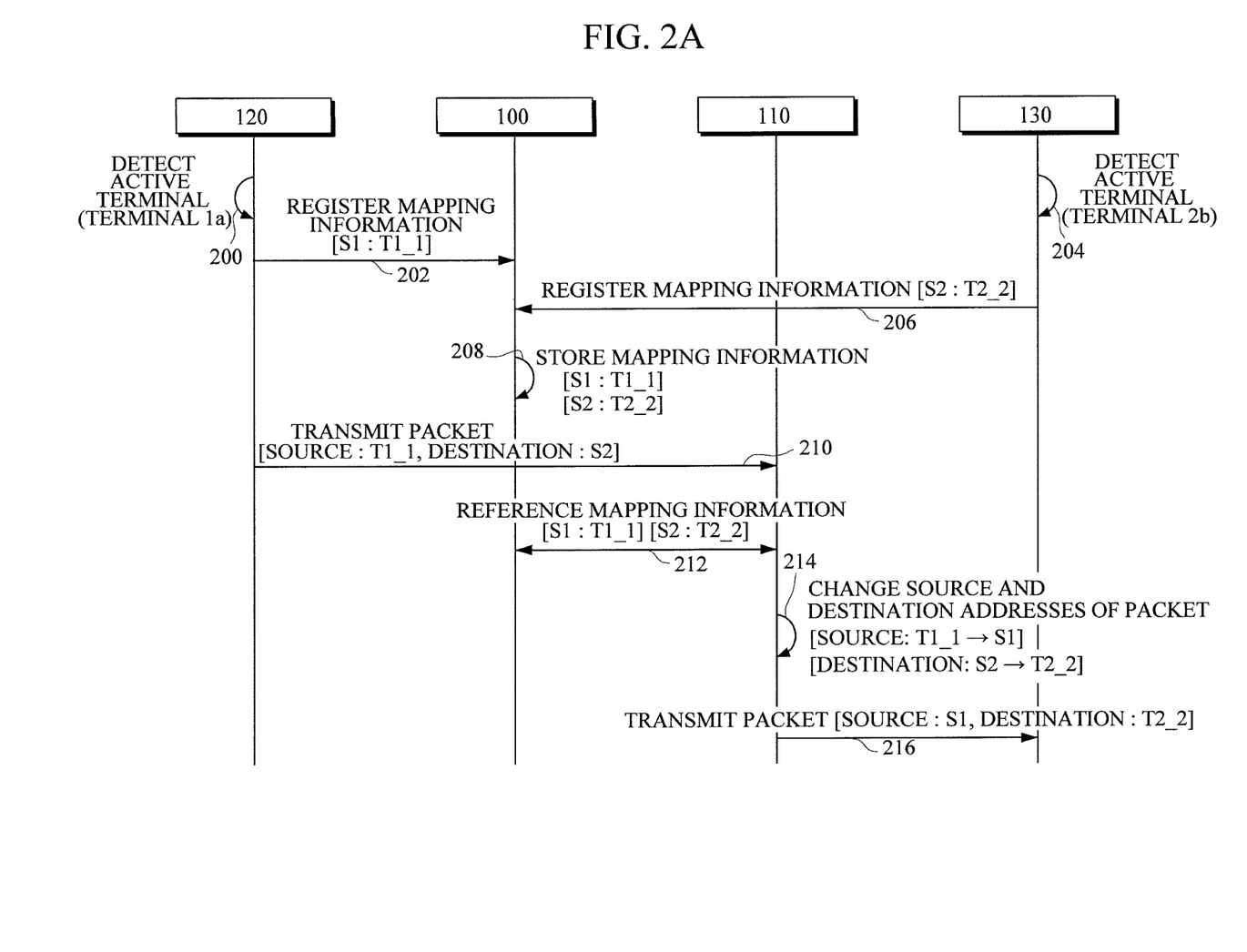
FIGS. 2A and 2B are flowcharts illustrating examples of virtualizing multiple terminals.
Figure 2B:
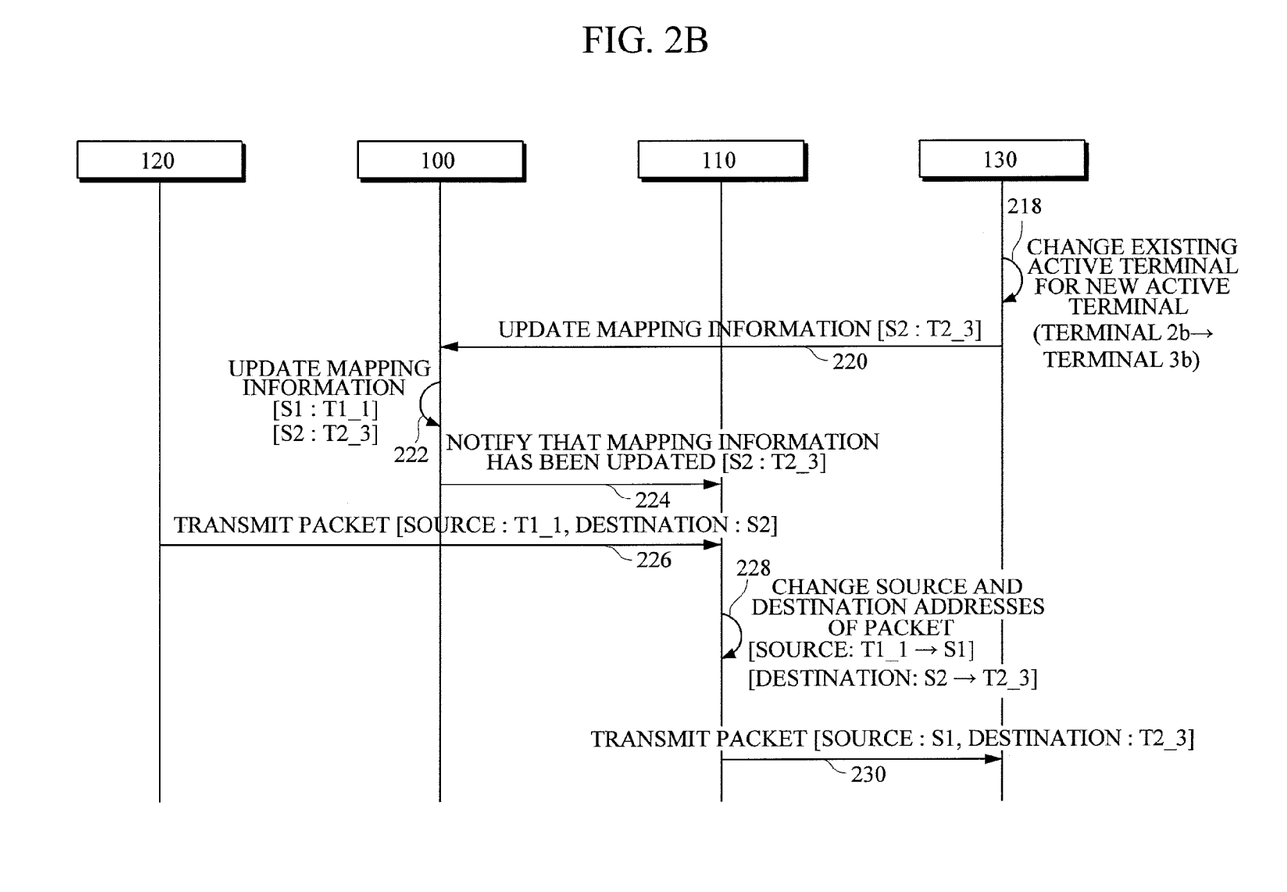

FIGS. 2A and 2B illustrate examples of virtualizing multiple terminals.

Referring to FIGS. 1, 2A, and 2B, in response to the terminal 1*a* (121), which is an active terminal in the first terminal group 120, being sensed (200), the mapping information management unit 100 may receive mapping information between the IP address of the first user and the IP address of the terminal 1*a* (121), i.e., [S1: T1_1], from the terminal 1*a* (121), and may register the received mapping information (202). Similarly, in response to the terminal 2*b* (132), which is an active terminal in the second terminal group 130, being sensed (204), the mapping information management unit 100 may receive mapping information between the IP address of the second user and the IP address of the terminal 2*b* (132), i.e., [S2: T2_2], from the terminal 2*b* (132), and may register the received mapping information (206).

In response to the registration of [S1: T1_1] and [S2: T2_2] being complete, the first and second terminal groups 120 and 130 may transmit a packet to or receive a packet from each other through terminal virtualization (210). For example, a packet may be transmitted from the first terminal group 120 to the second terminal group 130 via a network by using a typical IP protocol. In this example, the IP address of the terminal 1*a* (121), i.e., T1_1, may be set as the source address of the packet, and the IP address of the second user, i.e., S2, may be set as the destination address of the packet.

During the transmission of the packet via an IP network, the packet transmission control unit 110 may perform address conversion on the packet (214) by referencing the mapping information in the mapping information management unit 100 (212). For example, to transmit the packet from the first user to the second user, the source address of the packet may be changed from T1_1 to S1, and the destination address of the packet may be changed from S2 to T2_2 so that the packet may be transmitted to the terminal 2*b* (132) of the second user (216).

FIG. 2B illustrates an example of a control process that may be performed when an existing active terminal in the second terminal group 130 is changed for a new active terminal. Referring to FIG. 2B, in response to the existing active terminal in the second terminal group 130, for example, the terminal 2*b* (132), being changed for a new active terminal, for example, a terminal 3*b* (218), the terminal 3*b* may transmit updated mapping information to the mapping information management unit 100 (220). For example, the updated mapping information may include mapping information between the IP address of the second user and the IP address of the terminal 3*b*, i.e., [S2: T2_3]. In response to the updated mapping information being received, the mapping information management unit 100 may update mapping information present therein regarding the second user with the received updated mapping information (222), and may notify the packet transmission control unit 110 that the existing mapping information has been updated (224). Accordingly, the change of the addresses of a packet that is transmitted by the first terminal group 120 may be performed based on the IP address of the new active terminal in the second terminal group 130.

In the example illustrated in FIG. 2B, the mapping information management unit 100 may actively notify the packet transmission control unit 110 of any update in mapping information. In another example, the packet transmission control unit 110 may issue a request for updated mapping information to the mapping information management unit 100 either periodically or when necessary, and may thus be provided with any updated mapping information by the mapping information management unit 100.

In response to a packet being transmitted from the first terminal group 120 to the second terminal group 130 (226), the packet transmission control unit 110 may change the source address of the packet from T1_1 to S1, and may change the destination address of the packet from S2 to T2_3 (228). The address-changed packet may be transmitted to the new active terminal in the second terminal group 130, i.e., the terminal 3*b*, via a typical IP packet routing function (230).

In the example illustrated in FIG. 2B, the first user may continue to seamlessly transmit data without a requirement of data socket regeneration (or resetting) or session reestablishment even when the second user changes an existing active terminal for a new active terminal. In the example illustrated in FIG. 2B, the second user changes an existing active terminal for a new active terminal. The update of mapping information and the control of packet address conversion may also be performed in the same manner as that illustrated in FIG. 2B in a case in which the first user changes an existing active terminal for a new active terminal.

In a multi-screen environment, a user may use more than one terminal at the same time or switch from one active terminal to another active terminal to be provided with various services such as, for example, a real-time multimedia service. Any delays in switching from one active terminal to another active terminal, however, may cause the quality of, for example, real-time multimedia services (such as a sports broadcast service) to decrease. To address this problem, the same content may be temporarily provided to both an existing active terminal and a new active terminal so that Quality of Experience (QoE) and service continuity may increase.

Figure 3:
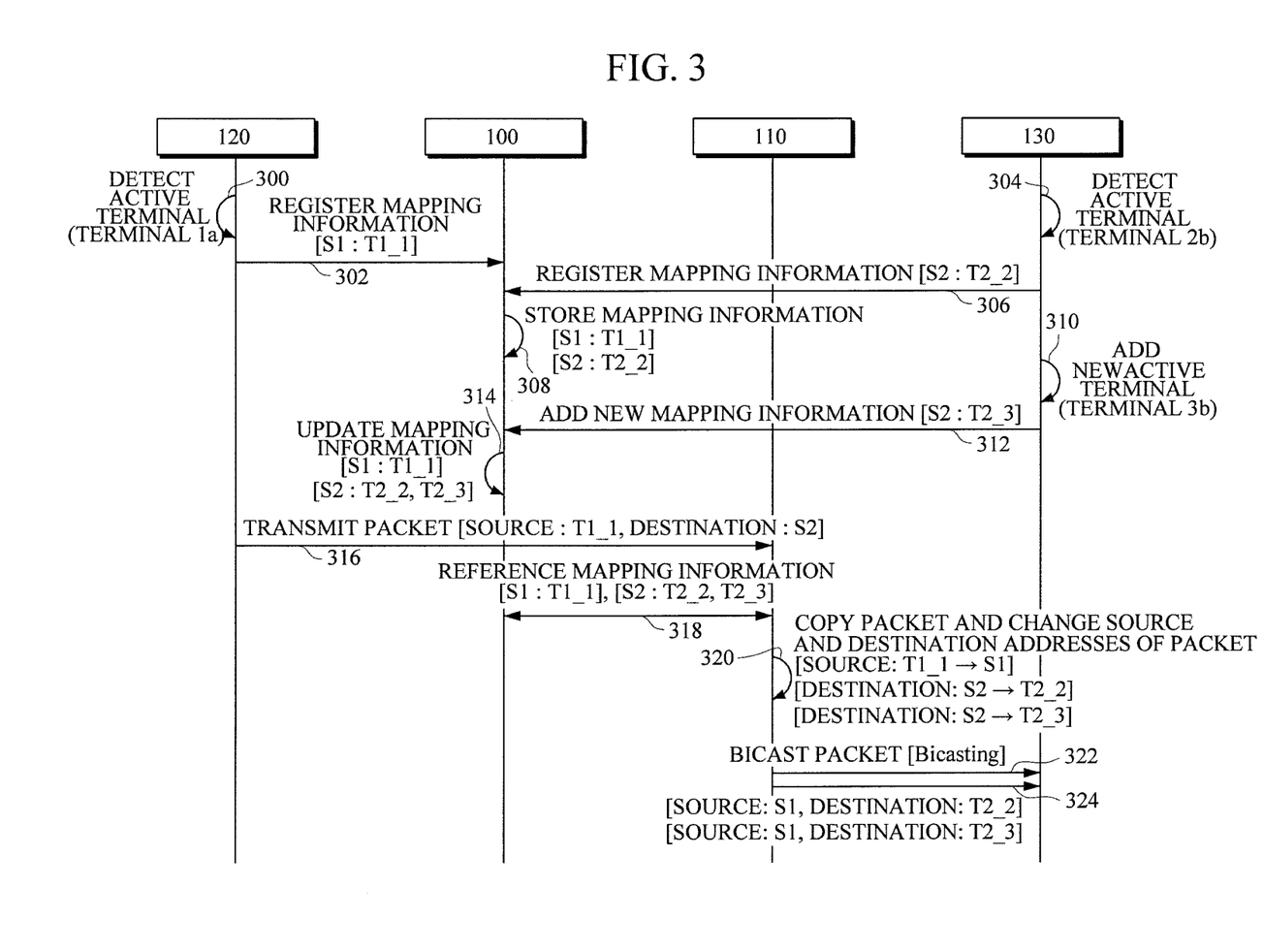
FIG. 3 is a flowchart illustrating an example of simultaneously mapping and bicasting IP addresses to support the simultaneous use of multiple terminals and improve the quality of services upon switching from one terminal to another.

FIG. 3 illustrates an example of simultaneously mapping and bicasting IP addresses to support the simultaneous use of multiple terminals and improve the quality of services upon switching from one terminal to another. More specifically, FIG. 3 illustrates an example of managing mapping information and controlling the transmission of packets in a case in which the second user uses two active terminals at the same time.

Operations 302, 304, 306, and 308 of FIG. 3 are the same as operations 202, 204, 206, and 208, respectively, of FIG. 2A. Referring to FIG. 3, [S1: T1_1] and [S2: T2_2] may be registered (308).

In response to the second user selecting the terminal 3b as an additional active terminal of the second terminal group 130 (310), the terminal 3b may issue a request for the addition of mapping information regarding the terminal 3b to the mapping information management unit 100 (312). The request issued by the terminal 3b may include mapping information between the IP address of the second user and the IP address of the terminal 3b, i.e., [S2: T2_3]. Mapping information regarding the second user may be updated from [S2: T2_2] to [S2: T2_2, T2_3] (314). Accordingly, the terminal 2b (132) and the terminal 3b may be simultaneously mapped as active terminals of the second user.

In response to the simultaneous mapping of the terminal 2b (132) and the terminal 3b being complete, the packet transmission control unit 110 may simultaneously bicast a packet to the terminal 2b (132) and the terminal 3b based on the updated mapping information regarding the second user. The packet transmission control unit 110 may make one or more copies of a packet whose destination address is S2, and may change the destination address of the copies of the packet from S2 to T2_2 or T2_3 (320). The copies of the packet may be simultaneously transmitted to the two active terminals of the second user, i.e., the terminal 2b (132) and the terminal 3b, via an IP packet routing function (322 and 324).

Figure 4:
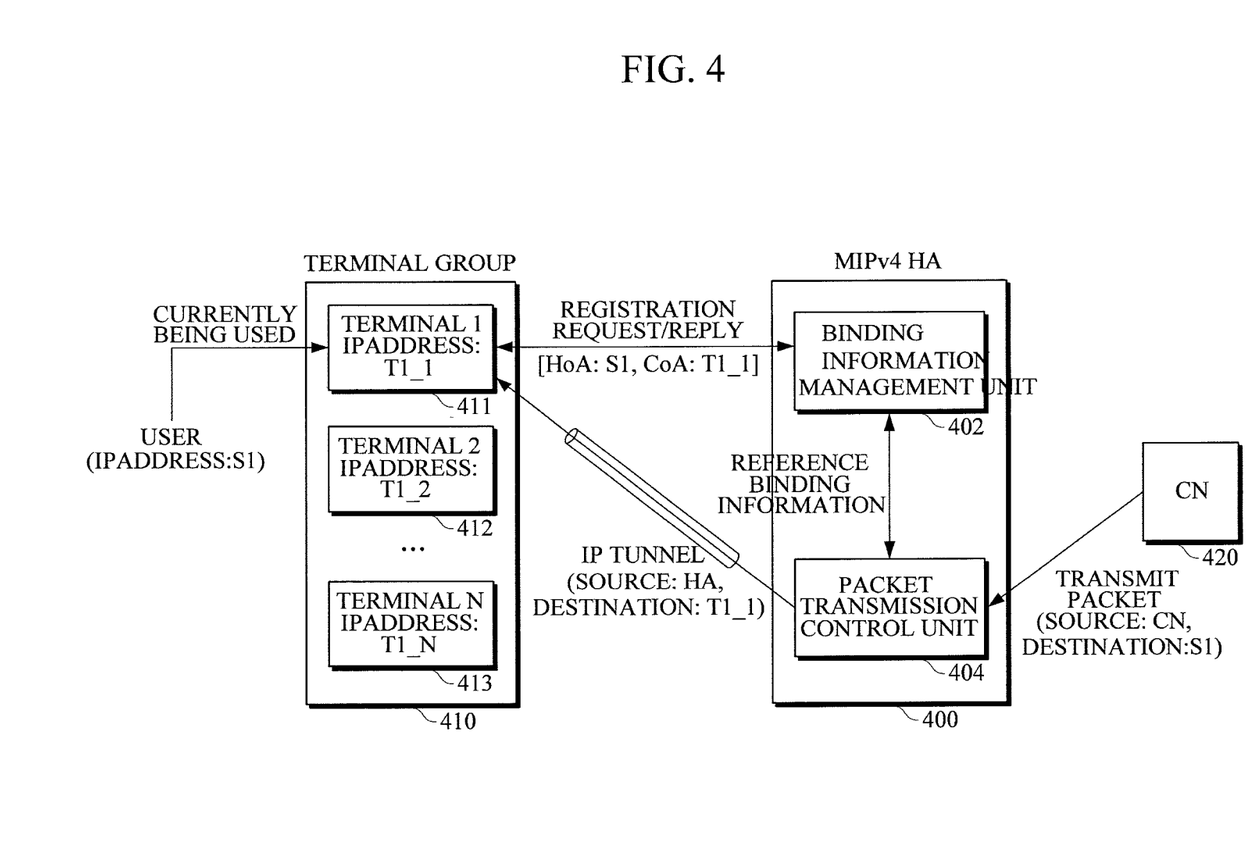
FIG. 4 is a diagram illustrating an example of an apparatus for virtualizing multiple terminals in a mobile IP (MIP)-based IP mobility control framework.

FIG. 4 illustrates an example of an MIP-based apparatus for virtualizing multiple terminals.

For example, referring to FIG. 4, an apparatus for virtualizing multiple terminals may be configured based on MIPv4. In another example, an apparatus for virtualizing multiple terminals may be configured based on various IP mobility control techniques, other than MIP. MIPv4 and MIPv6, which are Internet Engineering Task Force (IETF) standard communications protocols (RFC3344 and RFC3775), are well known to one of ordinary skill in the art, and thus, their detailed descriptions will be omitted.

MIP-based IP address binding and tunneling techniques are classified into FA care-of-address (CoA) method and a co-located CoA method according to whether there is an FA in a domain where a mobile terminal is located or whether a mobile terminal performs a mobility control process along with an HA. In the example illustrated in FIG. 4, the co-located CoA method may be employed to make it easy for each mobile terminal with an IP address to directly register and/or update IP address binding information for terminal virtualization.

Referring to FIG. 4, the concept of a correspondent node (CN) 420 may be the same as that defined in MIPv4. An HA 400 includes a binding information management unit 402 that manages mobility binding information and a packet transmission control unit 404 that controls the generation of an IP tunnel and the encapsulation of packets.

The management of IP address binding information for terminal virtualization may be realized as the management of a home address (HoA)-CoA binding information, which is performed by the HA 400.

The transmission of packets may be controlled by using an IP tunnel that may be set between the HA and a terminal group 410.

IP address binding is widely used in the field of IP mobility control that supports a seamless network connection in an IP network regardless of changes in the position of a user terminal. An IP mobility control technique such as, for example, MIP, PMIP, or the like, may involve managing binding information between a HoA, which remains unchanged while an Internet connection is maintained, and a CoA, which is a temporary address that may change according to the circumstances of a mobile terminal, and adjusting the path of the transmission of packets based on the binding information in response to a mobile terminal being handed over.

The path of the transmission of packets may be controlled using a tunneling technique. The tunneling technique may employ an encapsulation method that allows packets with the HoA of a mobile terminal as a destination address to be transmitted via a CoA corresponding to a current location of the mobile terminal. IP mobility control may provide a communication environment in which data can be seamlessly transmitted to a mobile terminal without a requirement of the reestablishment of a service session even when the mobile terminal continues to move from one network to another network.

The IP address mapping information registration and update processes for terminal virtualization, which have been described above with reference to FIGS. 1 through 3, may be realized using MIPv4 registration request and reply processes illustrated in FIG. 4. The MIPv4 registration request and replay processes are characterized by registering binding information between the HoA and the CoA of the terminal group 410 with the HA 400. For example, referring to FIG. 4, the IP address of a user, i.e., S1, may be set as a HoA, and the IP address of a first terminal 411, i.e., T1_1, may be set as a CoA. Accordingly, binding information may be registered or updated without a requirement of an additional function.

A packet address conversion process, which has been described above with reference to FIGS. 1 through 3, may be performed using an IP-in-IP tunneling function between the HA 400 and the terminal group 410. A packet that is transmitted from the CN 420 and destined for the IP address of the user, i.e., S1, may be received first by the HA 400, which is an anchor point. The HA 400 may determine a CoA via which to transmit the packet through tunneling with reference to binding information that is managed by the HA 400. For example, the HA 400 may encapsulate the packet by adding a packet header in which the IP address of the HA 400 is set as a source address and the IP address of the first terminal 411, i.e., T1_1, is set as a destination address to the packet, and may transmit the encapsulated packet so that the encapsulated packet may be transmitted to their final destination, i.e., the first terminal 411, via a basic IP tunneling function.

Figure 5A:
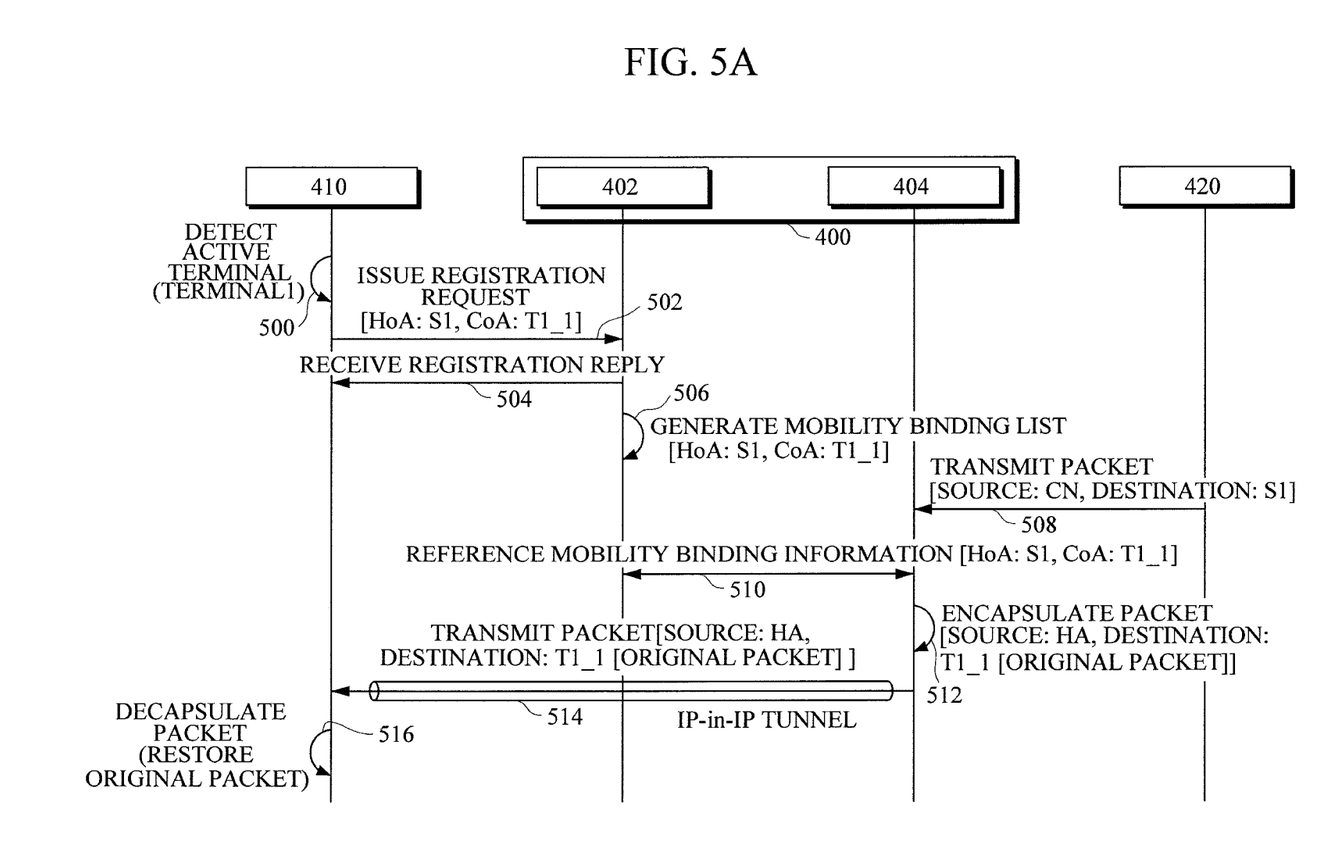
FIGS. 5A and 5B are flowcharts illustrating examples of a control operation performed by an MIP version 4-based apparatus for virtualizing multiple terminals.
Figure 5B:
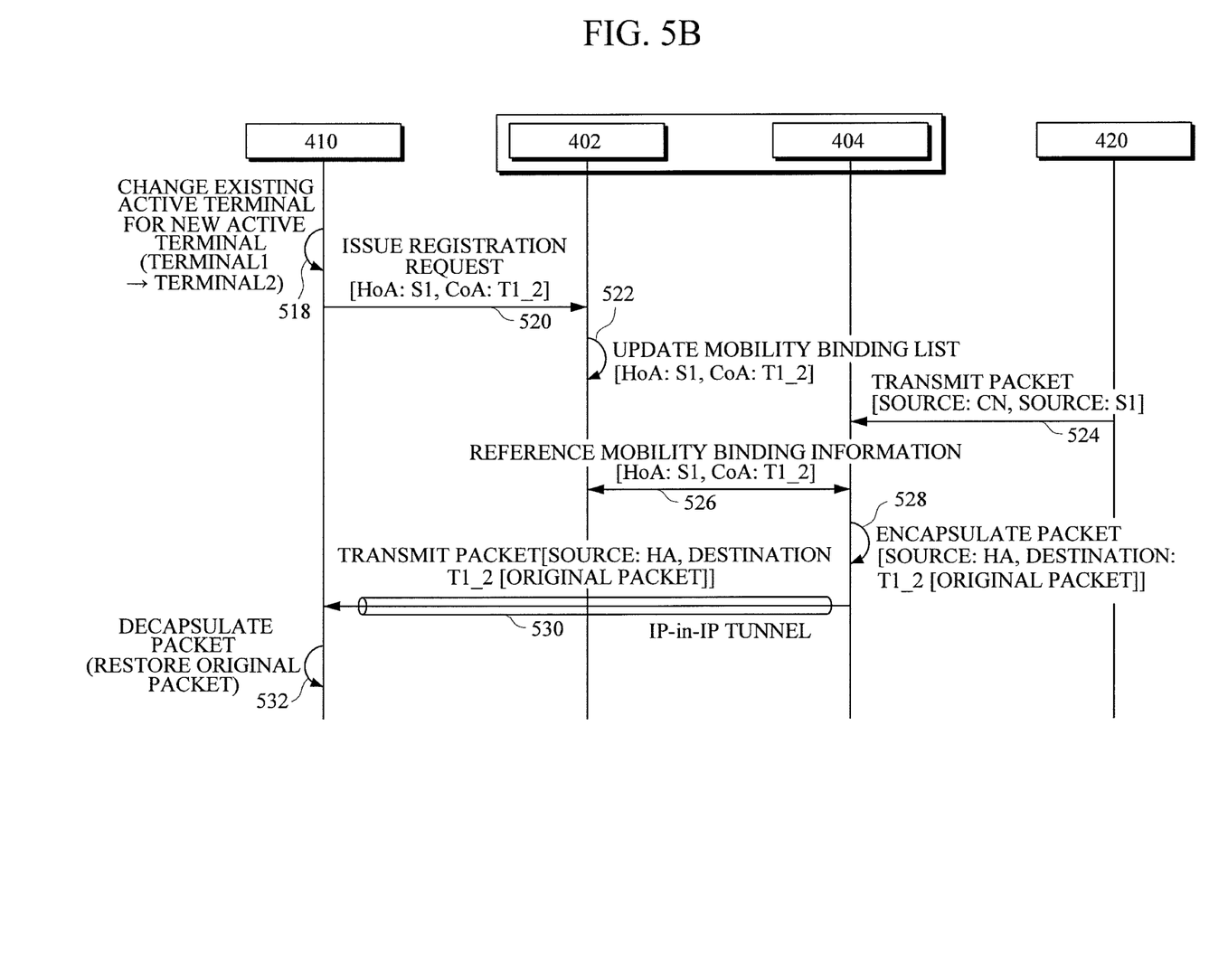

FIGS. 5A and 5B illustrate examples of a control operation performed by an MIP version 4-based apparatus for virtualizing multiple terminals.

Referring to FIGS. 4 and 5A, in response to one of the terminals in the terminal group 410, for example, the first terminal 411, being detected as an active terminal (500), an MIPv4 registration request message in which S1 is set as a HoA and T1_1 is set as a CoA may be transmitted to the HA 400 (502) to register IP address binding information for terminal virtualization.

The HA 400 may generate and manage a mobility binding entry [HoA: S1, CoA: T1_1] (506). In response to a packet whose destination address is S1 being received from the CN 420 (580), the HA 400 may reference its mobility binding information (510), and may encapsulate the received packet (512) by adding a packet header in which the IP address of the HA 400 is set as a source address and the IP address of the first terminal 411, i.e., T1_1, is set as a destination address to the received packet. The encapsulated packet may be transmitted to the first terminal 411 via an IP-in-IP tunnel (514). The first terminal 411 may remove a packet header from the encapsulated packet (516) and may thus restore the original packet received from the CN 420.

Referring to FIG. 5B, in response to the active terminal of the terminal group 410 being switched from the first terminal 411 to a second terminal 412 during the receipt of a packet from the CN 420, the second terminal 412 may transmit an MIPv4 registration request message in which S1 is set as a HoA and T1_2 is set as a CoA to the HA 400 to reflect into the mobility binding information of the HA 400 the fact that it is a new active terminal of the terminal group 410. The HA 400 may update mobility binding information present therein by replacing the mobility binding entry [HoA: S1, CoA: T1_1] with a mobility binding entry [HoA: S1, CoA:T1_2] (522).

In response to a packet whose destination address is S1 being received from the CN 420 (524), the HA 400 may reference the updated mobility binding information (526), and may encapsulate the received packet (528) by adding a packet header in which the IP address of the HA 400 is set as a source address and the IP address of the second terminal 412, i.e., T1_2, is set as a destination address to the received packet. The encapsulated packet may be transmitted to the second terminal 412 via an IP-in-IP tunnel (530). The second terminal 412 may remove a packet header from the encapsulated packet (532) and may thus restore the original packet received from the CN 420. Accordingly, it is possible for a user to seamlessly receive packets without a requirement of data socket regeneration (or resetting) or session reestablishment even when changing an existing active terminal for a new active terminal.

As described above, in a multi-screen service environment in which a user transmits or receives data using a plurality of terminals either simultaneously or sequentially, the terminals may be virtualized as a group so that they may appear as if they were a single terminal. Therefore, it is possible to provide seamless IP connectivity by using a single address regardless of which of the terminals is being used by the user.

In addition, even in a case in which the user switches his or her active terminal, it is possible to allow the user to seamlessly transmit or receive data without a requirement of data socket regeneration (or resetting) or session reestablishment.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for virtualizing multiple terminals, comprising:
one or more processors configured to:
virtualize a group of a plurality of transmitter terminals of a first user and a group of receiver terminals of a second user through changes of source and a destination addresses of a packet that is to be transmitted from an active transmitter of the transmitter terminal group to an active receiver of the receiver terminal group so that the transmitter terminal group and the receiver terminal group may be recognized as if they were each a single terminal, the first user being assigned a first unique identification, the second user being assigned a second unique identification, each of the plurality of transmitter terminals being assigned a unique transmitter identification, and each of the plurality of receiver terminals being assigned a unique receiver identification;

receive the packet to be transmitted from the active transmitter of the transmitter terminal group, the packet being received with the unique transmitter identification of the active transmitter as a source address and the second unique identification as a destination address;

after receiving the packet, change the source address of the packet from the unique transmitter identification of the active transmitter to the first unique identification and change the destination address of the packet from the second unique identification to the unique receiver identification of the active receiver; and transmit the packet with the changed source address and destination address to the active receiver.

2. The apparatus of claim 1, wherein the one or more processors are further configured to:

manage mapping information between the first unique identification and the unique transmitter identifications, and between the second unique identification and the unique receiver identifications; and change the source and destination addresses of the packet based on the mapping information.

3. The apparatus of claim 2, wherein the one or more processors are further configured to:

in response to the first or second user changing the active transmitter or the active receiver to a new active receiver, update the mapping information and manage the updated mapping information; and change the source and destination addresses of the packet based on the updated mapping information.

4. The apparatus of claim 2, wherein the one or more processors are further configured to:

in response to the first or second user adding a new active transmitter or receiver, register and manage additional mapping information between the first unique identification and the new active transmitter, or between the second unique identification and the new active receiver; and make as many copies of the packet as there is additional mapping information, change the source and destination addresses of the copies of the packet based on the additional mapping information, and transmit the copies of the packet at the same time according to the additional mapping information.

5. The apparatus of claim 2, wherein each of the first unique identification and the second unique identification includes at least one of an IP address, an email address, a public switched telephone network (PSTN) number, a mobile telephone network (MTN) number, a uniform resource locator (URL) or uniform resource identifier (URI), an international mobile subscriber identifier (IMSI), and a network access identifier (NAI).

6. The apparatus of claim 2, wherein the one or more processors are further configured to change the source and destination addresses of the packet by directly modifying a packet header or using a packet encapsulation-based tunneling method.

7. A method of virtualizing multiple terminals, comprising:
registering first mapping information between a first unique identification of a first user and a unique transmitter identification for each of a plurality of transmitter terminals of the first user;
registering second mapping information between a second unique identification of a second user and a unique receiver identification for each of a plurality of receiver terminals of the second user;
receiving, from an active transmitter terminal of the transmitter terminals, a packet to be transmitted from the active transmitter terminal to an active receiver terminal of the receiver terminals, the packet being received with the unique transmitter identification of the active transmitter terminal as a source address and the second unique identification as a destination address;
after receiving the packet, changing the source address of the packet from the unique transmitter identification of the active transmitter terminal to the first unique identification and changing the destination address of the packet from the second unique identification to the unique receiver identification of the active receiver terminal; and
transmitting the packet with the changed source address and destination address to the active receiver terminal.

8. The method of claim 7, further comprising:
in response to the first or second user changing the active transmitter terminal or active receiver terminal for a new active transmitter terminal or active receiver terminal, updating the first or second mapping information and managing the updated first or second mapping information; and
changing the source and destination addresses of the packet based on the updated first and second mapping information.

9. The method of claim 7, further comprising:
in response to the first or second user adding a new active transmitter terminal or a new active receiver terminal, registering and managing additional first or second mapping information between the first unique identification and the new active transmitter terminal, or between the second unique identification and the new active receiver terminal; and
copying the packet a number of times corresponding to a number of pieces of additional first and second mapping information, changing the source and destination addresses of the packet based on the additional first and second mapping information, and transmitting the copies of the packet at the same time according to the additional first and second mapping information.

* * * * *